United States Patent [19]
Scott

[11] Patent Number: 5,125,469
[45] Date of Patent: Jun. 30, 1992

[54] SYSTEM FOR STORING AND USING DECELERATION ENERGY

[76] Inventor: Gerald A. Scott, Box 1476, W. Somerville, Mass. 02144

[21] Appl. No.: 664,281

[22] Filed: Mar. 4, 1991

[51] Int. Cl.⁵ .............................................. B60K 6/04
[52] U.S. Cl. ................................... 180/65.2; 60/414; 60/716; 318/139; 322/11
[58] Field of Search .............. 180/65.2, 65.3, 65.1, 180/65.4, 65.6, 165; 318/139; 60/414, 716; 322/11

[56] References Cited

U.S. PATENT DOCUMENTS

| | | | |
|---|---|---|---|
| 2,755,898 | 7/1956 | Bell | 192/1.1 |
| 3,543,873 | 12/1970 | Toy | 180/65.2 |
| 3,623,568 | 11/1971 | Mori | 180/65.2 X |
| 3,771,821 | 11/1973 | Rist et al. | 180/65.2 X |
| 3,791,473 | 2/1974 | Rosen | 180/65.2 |
| 3,888,325 | 6/1975 | Reinbeck | 180/65.2 |
| 3,921,741 | 11/1975 | Garfinkle et al. | 180/65.2 X |
| 3,970,163 | 7/1976 | Kinoshita | 180/65.2 |
| 4,018,052 | 4/1977 | Laussermair | 60/414 |
| 4,021,677 | 5/1977 | Rosen et al. | 180/65.2 X |
| 4,165,795 | 8/1979 | Lynch et al. | 180/65.2 |
| 4,290,268 | 9/1981 | Lowther | 180/165 X |
| 4,305,254 | 12/1981 | Kawakatsu et al. | 180/65.2 X |
| 4,313,080 | 1/1982 | Park | 180/65.2 X |
| 4,351,405 | 9/1982 | Fields et al. | 180/65.2 |
| 4,351,409 | 9/1982 | Malik | 180/165 |
| 4,364,229 | 12/1982 | Shiber | 60/414 |
| 4,473,753 | 9/1984 | Izumi et al. | 180/165 X |
| 4,533,011 | 8/1985 | Heidemeyer et al. | 180/65.2 |
| 4,592,454 | 6/1986 | Michel | 192/3.23 |
| 4,663,935 | 5/1987 | Rohde | 60/414 |
| 4,674,280 | 6/1987 | Stuhr | 180/165 X |
| 4,813,510 | 3/1989 | Lexen | 180/165 |

Primary Examiner—Andres Kashnikow
Assistant Examiner—Michael Mar
Attorney, Agent, or Firm—Kriegsman & Kriegsman

[57] ABSTRACT

A system for storing deceleration energy from a motor vehicle and for using the stored deceleration energy to assist in accelerating the motor vehicle. In one embodiment, the system comprises a generator mechanically coupled to the drive train for converting deceleration energy to electrical energy, means electrically coupled to the generator for storing the electrical energy outputted by the generator, a motor mechanically coupled to the drive train and electrically coupled to the storing means for converting the stored electrical energy to mechanical energy used to assist in accelerating the motor vehicle, and a detector/switch for determining whether the motor vehicle is decelerating, accelerating, or neither and for switching the generator on and the motor off when the motor vehicle is decelerating for switching the generator off and the motor on when the motor vehicle is accelerating, and for switching the generator off and the motor off when the motor vehicle is neither accelerating nor decelerating.

9 Claims, 3 Drawing Sheets

SYSTEM FOR STORING AND USING DECELERATION ENERGY

BACKGROUND OF THE INVENTION

The present invention relates to a system for storing and using deceleration energy from a motor vehicle and, more particularly, to a system as heretofore described wherein the stored deceleration energy is used to assist in accelerating the motor vehicle.

In U.S. Pat. No. 4,813,510 to G. Lexen, which is herein incorporated by reference, a motor vehicle is described which has a drive arrangement for the rear axle, the drive arrangement consisting of an internal combustion engine whose output is connected with a variable speed transmission and brake recovery means. The brake recovery means is constructed as a self-contained system which is only connected with the variable speed transmission for charging and discharging of a high presure accumulator. This coupling operation is performed by a clutch operated in accordance with certain operating conditions. One side of the clutch is joined to a secondary output of the variable speed transmission and the other side is connected with the drive shaft of a hydraulic transducer, of which only one is required.

In U.S. Pat. No. 4,674,280 to H. W. Stuhr, which is herein incorporated by reference, a hydraulic apparatus for the storage of energy is described. The apparatus includes pump means driven by a source of energy, a pressure line receiving pressure fluid from the pump means, means in the pressure line for maintaining a constant pressure therein from the pump means, at least one pressure reservoir connected to the pressure line receiving fluid pressure therefrom and returning fluid pressure thereto and a restrictor means in the pressure line between the pump means and reservoir restricting flow in the line to maintain a predetermined constant pressure therein.

In U.S. Pat. No. 4,663,935 to S. M. Rohde, which is herein incorporated by reference, a vehicle having a plurality of ground engaging wheels wherein at least one of the wheels has a hydraulic pump/motor device included therein is described. The hydraulic fluid for the pump/motor device is stored in a toroidal tire portion of the wheel while the pump/motor is disposed in a hub portion of the wheel. The hydraulic fluid is drawn from a sump reservoir in the tire portion and is pumped to a high pressure liquid/gas accumulator in the tire portion during vehicle braking. When desired, the high pressure fluid is returned through the pump/motor to the sump reservoir during which time the energy of the high pressure fluid is delivered to the vehicle through the motoring action of the pump/motor.

In U.S. Pat. No. 4,592,454 to R. Michel, which is herein incorporated by reference, a hydropneumatic system for recovering braking energy for a vehicle having a "power shunt" transmission is described. The system is characterized in that it comprises two hydraulic switches or equivalent devices, the first of which permits two hydraulic machines or sets of machines to be combined or opposed and the second of which enables the two-direction lines joining these machines to the hydropneumatic accumulator and a low-pressure reservoir to be connected straight through or crossed-over.

In U.S. Pat. No. 4,473,753 to H. Izumi et al., which is herein incorporated by reference, a waste kinetic energy reclaiming system for an engine-driven vehicle is described. The system includes a generator and a variable torque-ratio coupling connecting the generator and the vehicle engine. The system also includes a clutch which selectably disconnects the coupling from the engine in response to whether or not braking of the vehicle is required so that the connection between the coupling and the engine is established only when braking is required.

In U.S. Pat. No. 4,364,229 to S. Shiber, which is herein incorporated by reference, an automotive energy managing transmission comprising a differential for splitting the power to mechanical and hydrostatic branches is described. The transmission is adapted to operate in several modes: hydrostatic in the city, hydromechanical and mechanical on the highway, regenerative braking and engine starting. The transmission includes an energy storage means and allows the engine to operate intermittently during city driving.

In U.S. Pat. No. 4,351,409 to M. J. Malik, which is herein incorporated by reference, a vehicle drive system having an engine and a multispeed transmission which can be selectively coupled with an energy storage system is described. The energy storage system includes a hydraulic member which is operable as a pump to store hydraulic fluid under pressure in an accumulator during certain drive system operations and to operate as a motor to use the stored fluid to drive the vehicle through the transmission, to start the engine or both during other drive system operations.

In U.S. Pat. No. 4,290,268 to F. E. Lowther, which is herein incorporated by reference, an auxiliary kinetic energy recovery system is described for a vehicle with a rotary sliding vane engine including a compressor, a combustion chamber and a motor in which the braking isdone by connecting the rotor of the compressor to a wheel and braking rotation of the rotor by controlling the gas flow through the rotary sliding vane compressor, such as by varying the outlet to increase the pressure ratio. This eliminates the conventional friction brakes. The compressed air generated during braking is fed to a surge tank for later use in operating the vehicle engine, thus recovering a portion of the kinetic energy of the vehicle. Additional amounts of kinetic energy are recovered by means of a closed circuit compressible gas circulating system which comprises an auxiliary compressor actuated by the same shaft as that attached to the engine compressor. Expansion of the compressed gas provides torque to the rotor of a motor which drives a shaft by means of which kinetic energy can be recovered as storable electrical power or compressed air.

In U.S. Pat. No. 4,018,052 to F. Laussermair, which is herein incorporated by reference, an accumulator arrangement for the storage and release of braking energy and for the braking and driving of a rotating shaft by means of a flywheel is described. The rotating shaft which is to be braked or driven is connected to a drive or gear unit having 2 degrees of freedom, one output of which is coupled to the flywheel via an installation operable either as a generator or a motor, and whose other output is connected with a second installation operable as a generator or a motor. The two installations are connected with each other for energy transmission, preferably through a buffer or shock absorbing device.

In U.S. Pat. No. 2,755,898 to V. A. Bell, which is herein incorporated by reference, a system for storing energy incident to braking of a machine is described. The system comprises driving means including a drive shaft, an accelerator having a range of lower energy operation during which it is operatively connected to accelerate the driving means, a fluid pump operatively connected to the driving shaft, a sump, an accumulator, incompressible hydraulic liquid in the sump and in the accumulator, the accumulator having energy storing means therein, and valve means for controlling recirculation of liquid through the pump without developing appreciable pumping pressure in lower energy operation, operative upon braking the vehicle for connecting hydraulic liquid from the sump through the pump to the accumulator to store energy therein, and operatively connected to the accelerator when it is postioned beyond the range of lower energy operation for connecting the accumulator through the pump to the sump and thereby applying additional energy to the driving shaft.

SUMMARY OF THE INVENTION

It is an object of the present invention to provide a new and improved system for storing deceleration energy from a motor vehicle and for using the stored energy to assist in accelerating the motor vehicle.

In order to achieve the foregoing and other objects of the invention, a system for storing deceleration energy from a motor vehicle and for using the stored energy to assist in accelerating the motor vehicle includes a generator mechanically coupled to the drive train of the motor vehicle for converting deceleration energy to electrical energy, means electrically coupled to the generator for storing the electrical energy, a motor mechanically coupled to the drive train and electrically coupled to the storing means for converting stored electrical energy to mechanical energy, and means for switching the generator on and the motor off when the motor vehicle is decelerating, for switching the generator off and the motor on when the motor vehicle is accelerating, and for switching the generator off and the motor off when the motor vehicle is neither accelerating nor decelerating.

Additional objects of the invention will be set forth in part in the description which follows, and in part will be obvious from the description or may be learned by practice of the invention. The objects of the invention may be realized and attained by means of the instrumentalities and combinations particularly pointed out in the appended claims. The accompanying drawings, which are hereby incorporated in and constitute a part of this Specification, illustrate the preferred embodiments of the invention and, together with the description, serve to explain the principles of the invention.

BRIEF DESCRIPTION OF THE DRAWINGS

In the accompanying drawings wherein like reference numerals represent like parts.

DETAILED DESCRIPTION OF PREFERRED EMBODIMENTS

The present invention is directed to a system for storing deceleration energy from a motor vehicle and for using the stored energy to assist in driving the motor vehicle. It is believed that use of the present invention will vastly improve motor vehicle fuel efficiency, thereby reducing the amount of fuel consumed by motor vehicles and the amount of pollution resultant therefrom.

Figure 1:
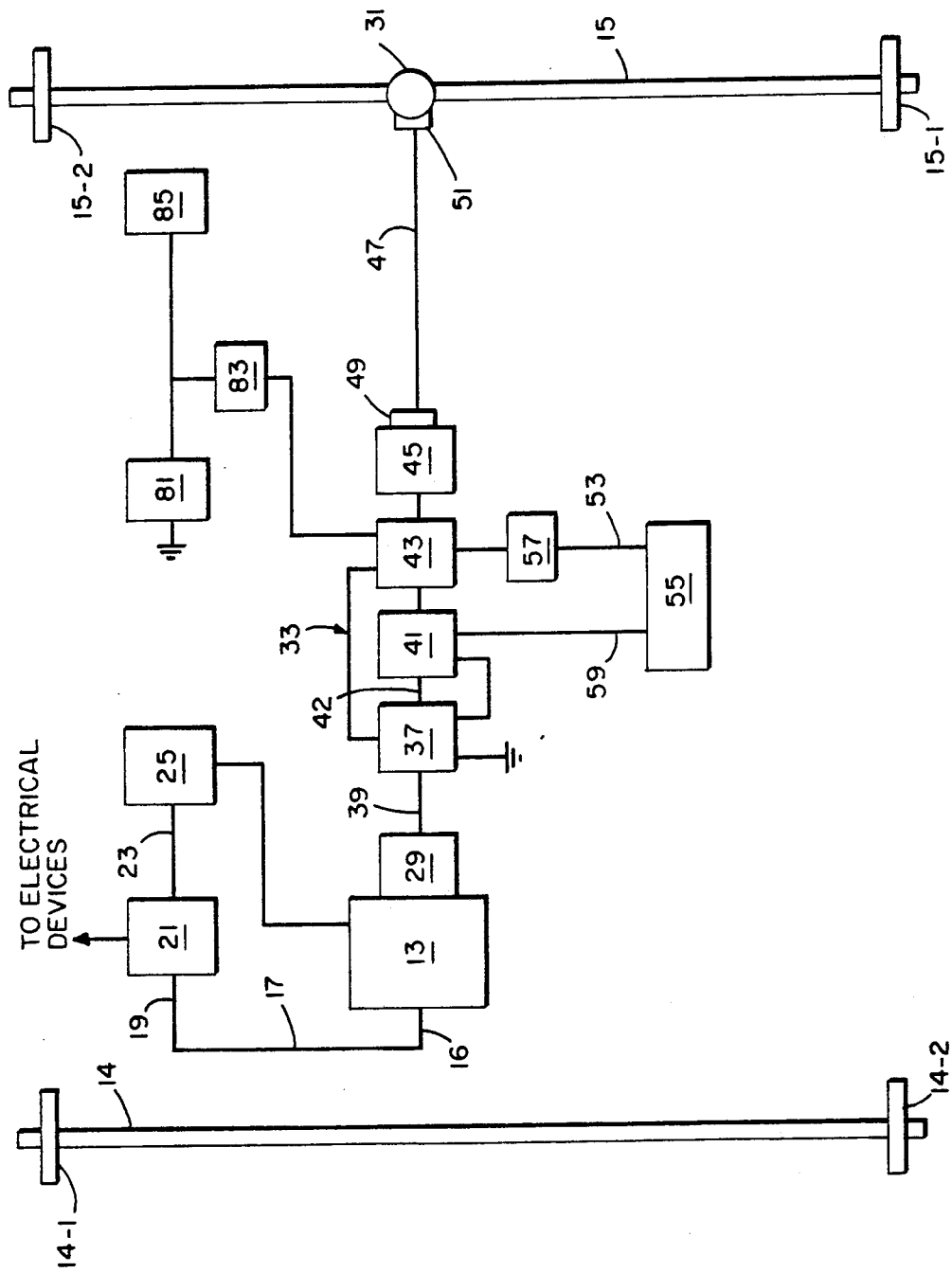
FIG. 1 is a schematic representation of one embodiment of a motor vehicle equipped with a system for storing deceleration energy from the motor vehicle and for using the stored energy to assist in accelerating the motor vehicle, the system being constructed according to the teachings of the present invention.

Referring now to FIG. 1, there is schematically illustrated a motor vehicle equipped with a system for storing deceleration energy and for using the stored braking energy to assist in accelerating the motor vehicle according to this invention, the motor vehicle being represented generally by reference numeral 11. For simplicity and clarity, the components of motor vehicle 11 that are not closely related to the operation of the system of the present invention are omitted from FIG. 1.

Motor vehicle 11 includes a front wheel axle 14 and a rear wheel axle 15. Front wheels 14-1 and 14-2 are mounted on front wheel axle 14 and rear wheels 15-1 and 15-2 are mounted on rear wheel axle 15.

Engine 13 includes a crankshaft 16 which is coupled through a belt 17 to the drive shaft 19 of an alternator 21. The electrical output of alternator 21 is coupled through a line 23 to a battery 25 and through another line 27 to various electrical devices, such as the radio and heater, in motor vehicle 11. Engine 13 is also connected to a transmission 29 which is coupled to the rear differential 31 through a drive shaft assembly 33. The rear axle 15 of vehicle 11 is mechanically coupled to rear differential 31.

Drive shaft assembly 33 includes an acceleration deceleration detector/switch 37 which is coupled at its front end to transmission 29 through a front drive shaft 39. A direct current motor 41 is mechanically coupled at its front end through its drive shaft 42 to the rear end of detector switch 37. A direct current generator 43 is mechanically coupled at its front end to the rear end of direct current motor 41. A central bearing 45 is coupled to direct current generator 43. A rear drive shaft 47 is coupled at its front end to central bearing 45 through a front universal joint 49 and at its rear end to differential 31 through a rear universal joint 51.

Generator 43 is electrically connected by a line 53 to a storage unit 55 which may be for example one or more batteries. Line 53 includes a capacitor 57 which protects unit 55 against sudden high surges of current. Motor 41 is electrically connected to storage unit 55 through a line 59. Line 59 may include a switch (not shown) which disconnects storage unit 55 from motor 41 when the energy in storage unit 55 drops below a predetermined threshold.

Motor 41 is used to provide a secondary source of power for vehicle. Generator 43 is used to convert deceleration energy into electrical energy. Storage unit 55 is used to store the electrical energy that is generated. Detector/switch 37 is used to sense acceleration and deceleration and cause motor 41 to be energized when acceleration is detected and generator 43 to be energized when deceleration is detected.

Figure 2:
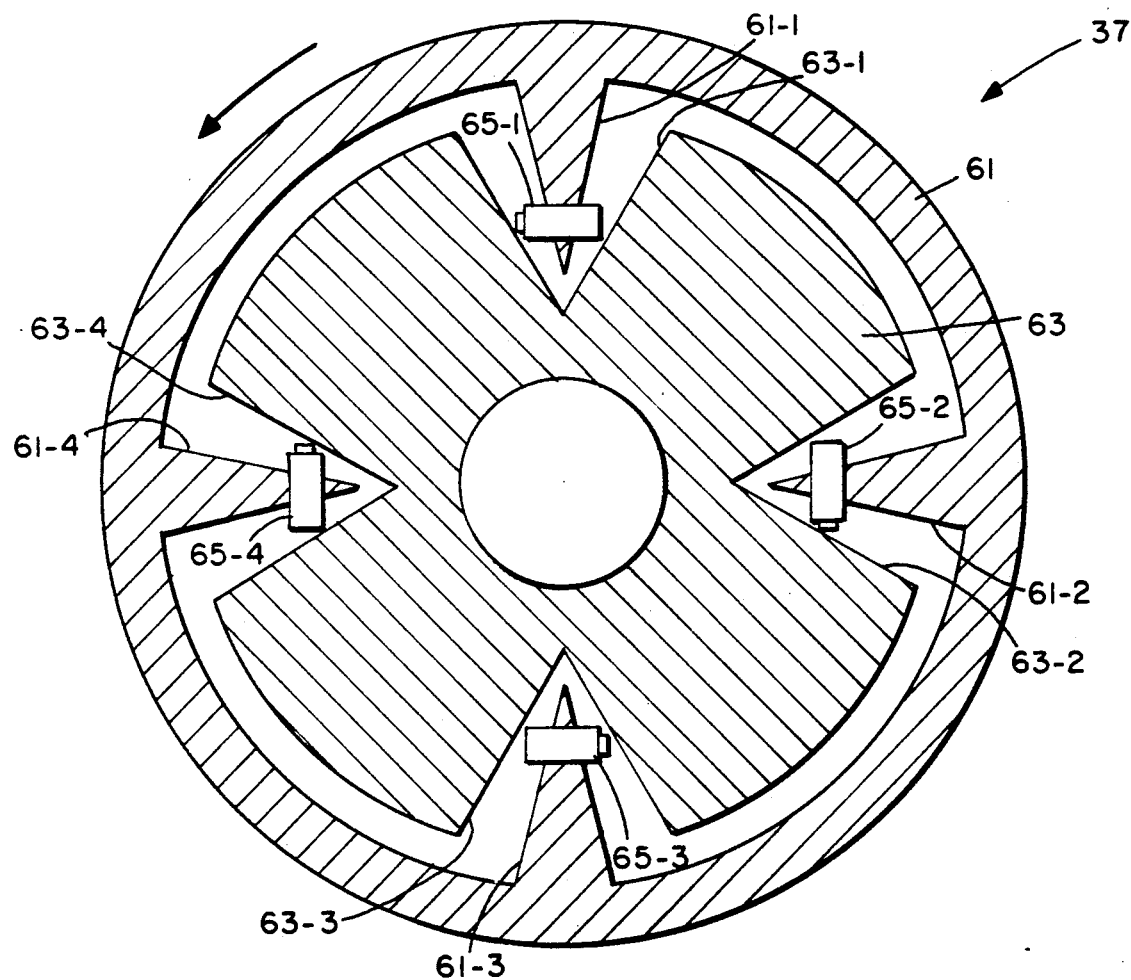
FIG. 2 is a cross-section view of the detector/switch schematically shown in FIG. 1.
Figure 3:
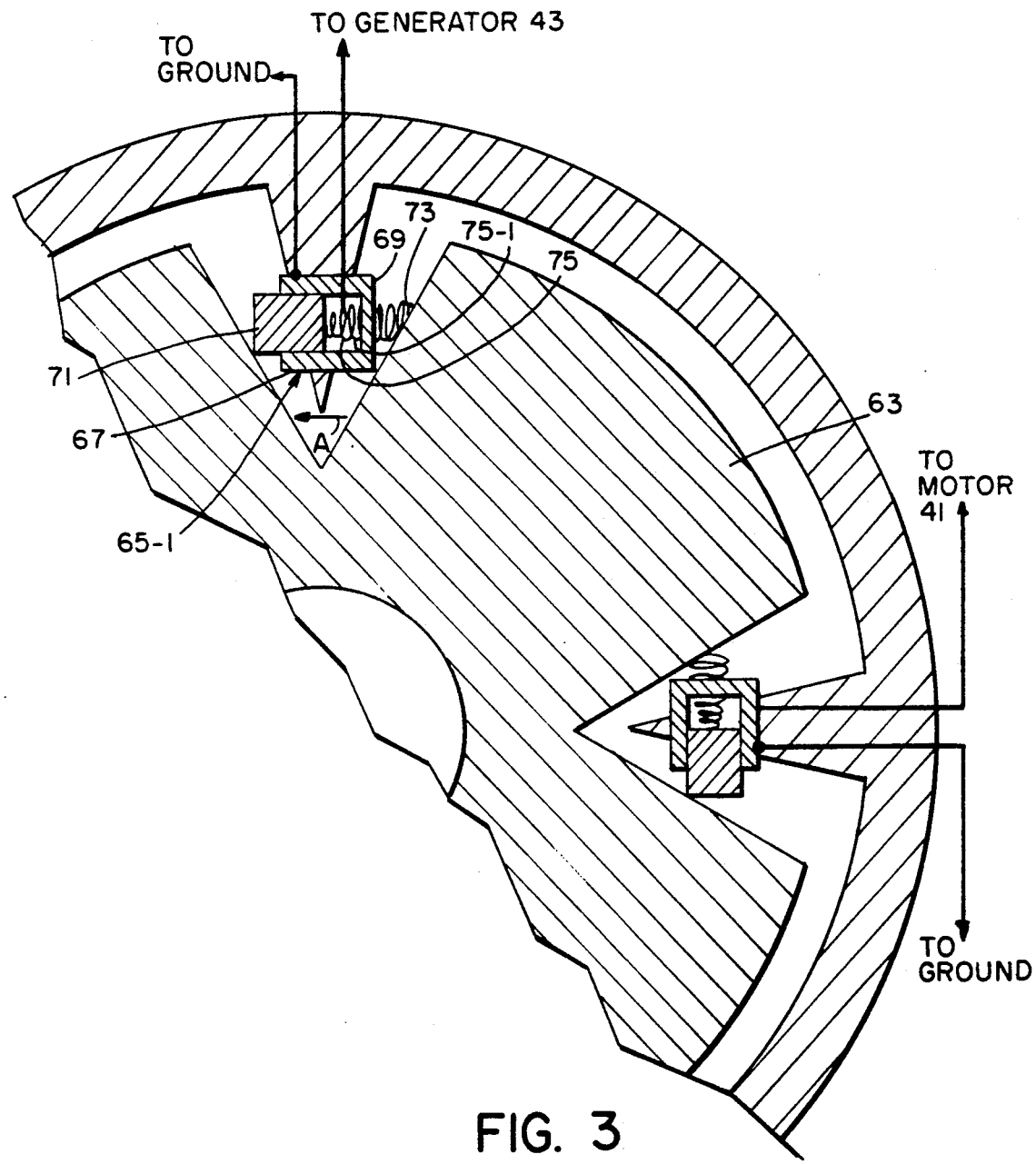
FIG. 3 is an enlarged cross-section view of a portion of the detector/switch shown in FIG. 2.

Referring now to FIGS. 2 and 3, the construction of detector/switch 37 is shown in more detail.

Detector/switch 37 includes a coupling having an outer ring shaped component 61 and an inner annular shaped component 63. Outer ring shaped component 61 is fixedly attached to drive shaft 42 of motor 41. Inner annular shaped component 63, on the other hand, is fixedly attached to first drive shaft 39. As can be appreciated, any acceleration or deceleration of engine 13 will cause rotational movement of component 61 relative to component 63, with the direction of movement depending on whether it is accelerating or decelerating. Component 61 includes four circumferentially spaced triangular projections 61-1 through 61-4 which extend into circumferentially shaped triangular slots 63-1 through 63-4, respectively, in component 63. A sending unit 65 is fixedly mounted on each projection, the sending unit on projection 61-1 being identified by reference numeral 65-1, the sending unit on projection 61-2 as 65-2 and so forth. Sending units 65-1 and 65-3 are constructed and mounted so as to detect deceleration while sending units 65-2 and 65-4 are constructed and mounted so as to detect acceleration.

Sending unit 65-1 includes a tubular housing of conductive material 67 closed at one end 69. A piston 71 is slidably mounted in housing 67. An outer spring 73 pushes unit 65-1 in the direction shown by arrow A. A coil spring 75 whose conductively increases as it is compressed is sandwiched between piston 71 and end 69. One end 75-1 of spring 75 is connected to generator 43. When motor vehicle decelerates the rotational force imparted to component 61 temporarily exceeds that imparted to component 63, causing component 61 to rotate in the direction of arrow A and causing coil 75 to be compressed and its conductively to increase, the amount of compression being directly proportional to the amount of deceleration. This, in turn, will cause the output of generator 43 to increase.

Sending unit 65-3 is identical to sending unit 65-1. Sending units 65-2 and 65-4 differ from sending unit 65-1 in that they are constructed and mounted to detect rotation of component 61 in the other direction i.e. caused by acceleration and are connected directly to motor 41 rather than to generator 43.

Detector/switches other than that shown may be employed. For example, acceleration and deceleration can be detected by taking a vacuum reading of the manifold pressure or by using mechanical linkage switches tied into the gas pedal and brake pedal or by using hydraulic governors. Also the motor and generator could be controlled by a computer which receives signals corresponding to acceleration or deceleration from one or more appropriately located sensors.

Motor vehicle 11 further includes brake light 81 which is connected through a normally open relay 83 to a brake light switch 85. Relay 83 is also connected to generator 43. Depression of the brake pedal (not shown) will cause relay 83 to be closed, bypassing switch 37 and energzing generator 43 fully.

In operation, when vehicle 11 is running at a constant speed, switch 37 does not enable energization of generator 43 or motor 41.

In contrast, when vehicle 11 decelerates and the brake pedal is not depressed, relay 83 is open and switch 37 causes generator 43 to be energized by an amount proportional to the amount of deceleration. Consequently, generator 43 is energized the maximum amount, which then converts the mechanical energy of axle 35 into electrical energy which is transmitted to unit 55 through capacitor 57 for storage.

When vehicle 11 accelerates, switch 37 causes motor 41 to be energized converting energy stored in unit 55 into mechanical energy, which is used to assist in turning axle 35.

It is to be understood that while generator 43 and motor 41 have been been described above as being separate elements, it is considered to be within the scope of the present invention for generator 43 and motor 41 to be a single element which can be made to function as a generator under certain conditions and a motor under other conditions.

In another embodiment (not shown), the engine and the detector/switch are mechanically coupled to front wheel axle 87, rather than rear wheel axle 35, each rear wheel is connected to a separate rear wheel axle and a pair of motor/generator combinations are provided, one coupled to each rear wheel axle. In this manner a four wheel drive vehicle is achieved in which the front wheels are driven by engine 13 and each rear wheel is driven by a separate (electric) motor.

The embodiments of the present invention are intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A system for storing deceleration energy from a motor vehicle and for using the stored deceleration energy to at least assist in accelerating the motor vehicle, wherein the motor vehicle includes an engine, a wheel axle having a wheel mounted on each end thereof, and a drive shaft having a first piece coupled to the engine and a second piece coupled to the wheel axle, the system comprising:
   a) means for storing electrical energy;
   b) a generator, mechanically coupled to said drive shaft and electrically coupled to said storing means, for converting deceleration energy into electrical energy;
   c) a motor, mechanically coupled to said drive shaft and electrically coupled to said storing means, for converting the stored electrical energy into mechanical energy; and
   d) switch means for switching the generator on and the motor off when the motorized vehicle is decelerating, for switching the generator off and the motor on when the motorized vehicle is accelerating, and for switching the generator off and the motor off when the motorized vehicle is neither decelerating nor accelerating, wherein said switch means comprises a coupling, said coupling having an outer ring shaped component coupled to said second piece of said drive shaft, said outer ring shaped component being shaped to include a pair of inwardly extending projections, and an inner annular shaped component coupled to said first piece of said drive shaft, said inner annular shaped component being shaped to include a pair of appropriately sized slots adapted to receive said inwardly extending projections, and a pair of sending units, one of said pair of sending units being mounted on one of said pair of inwardly extending projections for actuating said generator when said outer ring shaped component rotates faster than said inner annular shaped component, the other of said pair of sending units being mounted on the other of said pair of inwardly extending projections for actuating said motor when said inner annular shaped component rotates faster than said outer ring shaped component.

2. The system as claimed in claim 1 wherein said generator and said motor are separate components.

3. The system as claimed in claim 1 wherein said generator and said motor are the same.

4. The system as claimed in claim 1 further comprising a capacitor interconnecting said generator and said storing means.

5. The system as claimed in claim 1 wherein each of said sending units comprises a tubular housing of conductive material closed at one end, a piston slidably mounted in said tubular housing, a coil spring whose conductivity increases as it is compressed, said coil spring being disposed within said housing between said piston and said closed end of said housing, and an outer spring disposed outside of said housing and extending between the closed end of said housing and said inner annular shaped component.

6. A motorized vehicle comprising:
a) a wheel axle, said wheel axle having a wheel mounted on each end;
b) an engine for use in driving the rotation of said wheel axle;
c) a drive shaft including a first piece and a second piece, said first piece being mechanically coupled to said engine and said second piece being mechanically coupled to said wheel axle;
d) means for storing electrical energy; and
e) a drive shaft assembly interconnecting said first piece of said drive shaft and said second piece of said drive shaft, said drive shaft assembly including:
i) a generator, mechanically coupled to said second piece of said drive shaft and electrically coupled to said storing means, for converting deceleration energy into electrical energy,
ii) a motor, mechanically coupled to said second piece of said drive shaft and electrically coupled to said storing means, for converting the stored electrical energy into mechanical energy, and
iii) switch means for switching the generator on and the motor off when the motorized vehicle is decelerating, for switching the generator off and the motor on when the motorized vehicle is accelerating, and for switching the generator off and the motor off when the motorized vehicle is neither decelerating nor accelerating, wherein said switch means comprises a coupling, said coupling having an outer ring shaped component coupled to said second piece of said drive shaft, said outer ring shaped component being shaped to include a pair of inwardly extending projections, and an inner annular shaped component coupled to said first piece of said drive shaft, said inner annular shaped component being shaped to include a pair of appropriately sized slots adapted to receive said inwardly extending projections, and a pair of sending units, one of said pair of sending units being mounted on one of said pair of inwardly extending projections for actuating said generator when said outer ring shaped component rotates faster than said inner annular shaped component, the other of said pair of sending units being mounted on the other of said pair of inwardly extending projections for actuating said motor when said inner annular shaped component rotates faster than said outer ring shaped component.

7. The motorized vehicle as claimed in claim 6 wherein each of said sending units comprises a tubular housing of conductive material closed at one end, a piston slidably mounted in said tubular housing, a coil spring whose conductivity increases as it is compressed, said coil spring being disposed within said housing between said piston and said closed end of said housing, and an outer spring disposed outside of said housing and extending between the closed end of said housing and said inner annular shaped component.

8. A system for storing deceleration energy from a motor vehicle and for using the stored deceleration energy to at least assist in accelerating the motor vehicle, wherein the motor vehicle includes an engine, a wheel axle having a wheel mounted on each end thereof, and a drive shaft having a first piece coupled to the engine and a second piece coupled to the wheel axle, the system comprising:
a) means for storing electrical energy;
b) a generator, mechanically coupled to said drive shaft and electrically coupled to said storing means, for converting deceleration energy into electrical energy;
c) a motor, mechanically coupled to said drive shaft and electrically coupled to said storing means, for converting the stored electrical energy into mechanical energy; and
d) switch means for switching the generator on and the motor off when the motorized vehicle is decelerating, for switching the generator off and the motor on when the motorized vehicle is accelerating, and for switching the generator off and the motor off when the motorized vehicle is neither decelerating nor accelerating, wherein said switch means comprises a coupling, said coupling having an outer ring shaped component coupled to said second piece of said drive shaft, said outer ring shaped component being shaped to include a pair of inwardly extending projections, and an inner annular shaped component coupled to said first piece of said drive shaft, said inner annular shaped component being shaped to include a pair of appropriately sized slots adapted to receive said inwardly extending projections, first actuating means mounted on one of said pair of inwardly extending projections for actuating said generator when a greater rotational force is imparted to said outer ring shaped component than to said inner annular shaped component, and second actuating means mounted on the other of said pair of inwardly extending projections for actuating said motor when a greater rotational force is imparted to said inner annular shaped component than to said outer ring shaped component.

9. The system as claimed in claim 8 wherein said first actuating means comprises a sending unit comprising a tubular housing of conductive material closed at one end and open at the opposite end, a piston slidably mounted in said open end of said tubular housing, said piston being adapted to be compressed by said inner annular shaped component when a greater rotational force is imparted to said outer ring shaped component than to said inner annular shaped component, a coil spring whose conductivity increases as it is compressed, said coil spring being disposed within said housing between said piston and said closed end of said housing, and an outer spring disposed outside of said housing and extending between the closed end of said housing and said inner annular shaped component and wherein said second actuating means comprises a sending unit comprising a tubular housing of conductive material closed at one end and open at the opposite end, a piston slidably mounted in said open end of said tubular housing said piston being adapted to be compressed by said inner annular shaped component when a greater rotational force is imparted to said inner annular shaped component than to said outer ring shaped component, a coil spring whose conductivity increases as it is compressed, said coil spring being disposed within said housing between said piston and said closed end of said housing, and an outer spring disposed outside of said housing and extending between the closed end of said housing and said inner annular shaped component.

* * * * *